(12) United States Patent
Yoshikawa et al.

(10) Patent No.: US 10,425,250 B2
(45) Date of Patent: Sep. 24, 2019

(54) TRANSMISSION SYSTEM FOR CONTROLLING CONTROL/MONITORING TARGETS AND TRANSMISSION STATION FOR CONTROLLING CONTROL/MONITORING TARGETS

(71) Applicants: Kabushiki Kaisha Toshiba, Minato-ku, Tokyo (JP); Toshiba Infrastructure Systems & Solutions Corporation, Kawasaki-shi, Kanagawa (JP)

(72) Inventors: Masaomi Yoshikawa, Inagi Tokyo (JP); Yuuji Umeda, Tachikawa Tokyo (JP); Motohiko Okabe, Fuchu Tokyo (JP)

(73) Assignees: Kabushiki Kaisha Toshiba, Tokyo (JP); Toshiba Infrastructure Systems & Solutions Corporation, Kanagawa (JP)

(*) Notice: Subject to any disclaimer, the term of this patent is extended or adjusted under 35 U.S.C. 154(b) by 42 days.

(21) Appl. No.: 15/557,785

(22) PCT Filed: Dec. 18, 2015

(86) PCT No.: PCT/JP2015/085554
§ 371 (c)(1),
(2) Date: Sep. 12, 2017

(87) PCT Pub. No.: WO2016/147513
PCT Pub. Date: Sep. 22, 2016

(65) Prior Publication Data
US 2018/0076973 A1    Mar. 15, 2018

(30) Foreign Application Priority Data
Mar. 19, 2015 (JP) .................. 2015-056864

(51) Int. Cl.
*H04L 12/413* (2006.01)
*H04L 12/40* (2006.01)
*H04L 12/403* (2006.01)
*H04J 3/06* (2006.01)

(52) U.S. Cl.
CPC .............. *H04L 12/413* (2013.01); *H04J 3/06* (2013.01); *H04J 3/0652* (2013.01); *H04L 12/40* (2013.01); *H04L 12/403* (2013.01)

(58) Field of Classification Search
CPC ..... H04L 12/413; H04L 12/40; H04L 12/403; H04J 3/06; H04J 3/0652
See application file for complete search history.

(56) References Cited

U.S. PATENT DOCUMENTS 5,919,250 A * 7/1999 Shimokawa .......... H04L 12/413
370/463
6,711,131 B1 * 3/2004 Shiobara ................. H04L 12/28
370/235
(Continued)

FOREIGN PATENT DOCUMENTS

JP    H04-039819 B2    6/1992
JP    2000-092089 A    3/2000
(Continued)

OTHER PUBLICATIONS

International Search Report mailed by Japan Patent Office dated Feb. 23, 2016 in the corresponding PCT Application No. PCT/JP2015/085554.
(Continued)

*Primary Examiner* — Robert C Scheibel
*Assistant Examiner* — Manuel A. Ortiz Diaz
(74) *Attorney, Agent, or Firm* — Knobbe, Martens, Olson & Bear, LLP

(57) ABSTRACT

A transmission system of embodiments is a transmission system including a plurality of transmission stations connected together via a single transmission path. Each transmission station includes a sending controller, an obtaining unit, and a first storage. The obtaining unit is configured to obtain first information regarding sending or reception of a communication frame in synchronization with sending or (Continued)

reception of the communication frame. The first storage is configured to store the first information and second information indicating the date and time of obtaining the first information.

12 Claims, 16 Drawing Sheets

(56) References Cited

U.S. PATENT DOCUMENTS

| | | | |
|---|---|---|---|
| 2011/0019698 A1* | 1/2011 | Akae | H04J 3/0664 370/509 |
| 2012/0163239 A1* | 6/2012 | Okabe | H04L 12/42 370/258 |

FOREIGN PATENT DOCUMENTS

| | | | |
|---|---|---|---|
| JP | 2004-166074 A | | 6/2004 |
| JP | 2004166074 A | * | 6/2004 |
| JP | 2009-038477 A | | 2/2009 |

OTHER PUBLICATIONS

Yoichi Takayanagi, "SCF 2005/INCHEM Tokyo 2005/ Maintenance Techno Show 2005 Tokubetsu Kikaku Kogyoyo Ethernet no Taido <Hyojunka Gijutsu Doko> Real Time Kogyoyo Ethernet No Sakigake", Joho Seigyo Network TC-net 100, Keiso, Dec. 1, 2005, vol. 48, No. 12, pp. 26-29.

* cited by examiner

FIG.3A

| DA | SA | TYPE | IP HEADER | TCP/UDP HEADER | TRANSMISSION STATION LIVE INFORMATION | FCS |

FIG.3B

| DA | SA | TYPE | IP HEADER | TCP/UDP HEADER | SCAN DATA | FCS |

FIG.3C

| DA | SA | TYPE | IP HEADER | TCP/UDP HEADER | CMP INFORMATION | FCS |

FIG.4

| TRANSMISSION STATION t1 | t2 | t3 | t4 |
|---|---|---|---|
| t5 | t6 | t7 | t8 |
| t9 | t10 | t11 | t12 |
| ... | ... | ... | tn |

FIG.5

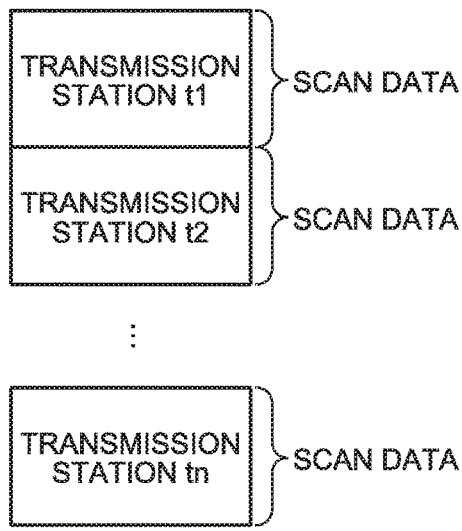

<SENDING INFORMATION>
SENDING TIME, FRAME TYPE, SENDING SOURCE,
SENDING DESTINATION, MANAGEMENT INFORMATION A, B, C ⋯
SENDING TIME, FRAME TYPE, SENDING SOURCE,
SENDING DESTINATION, MANAGEMENT INFORMATION A, B, C ⋯
      .
SENDING TIME, FRAME TYPE, SENDING SOURCE,
SENDING DESTINATION, MANAGEMENT INFORMATION A, B, C ⋯
      .

<RECEPTION INFORMATION: TRANSMISSION STATION t1>
RECEPTION TIME, FRAME TYPE, SENDING SOURCE,
SENDING DESTINATION, MANAGEMENT INFORMATION A, B, C ⋯
RECEPTION TIME, FRAME TYPE, SENDING SOURCE,
SENDING DESTINATION, MANAGEMENT INFORMATION A, B, C ⋯
      .
RECEPTION TIME, FRAME TYPE, SENDING SOURCE,
SENDING DESTINATION, MANAGEMENT INFORMATION A, B, C ⋯
      .

⋮

<RECEPTION INFORMATION: TRANSMISSION STATION tn>
RECEPTION TIME, FRAME TYPE, SENDING SOURCE,
SENDING DESTINATION, MANAGEMENT INFORMATION A, B, C ⋯
RECEPTION TIME, FRAME TYPE, SENDING SOURCE,
SENDING DESTINATION, MANAGEMENT INFORMATION A, B, C ⋯
      .
RECEPTION TIME, FRAME TYPE, SENDING SOURCE,
SENDING DESTINATION, MANAGEMENT INFORMATION A, B, C ⋯
      .

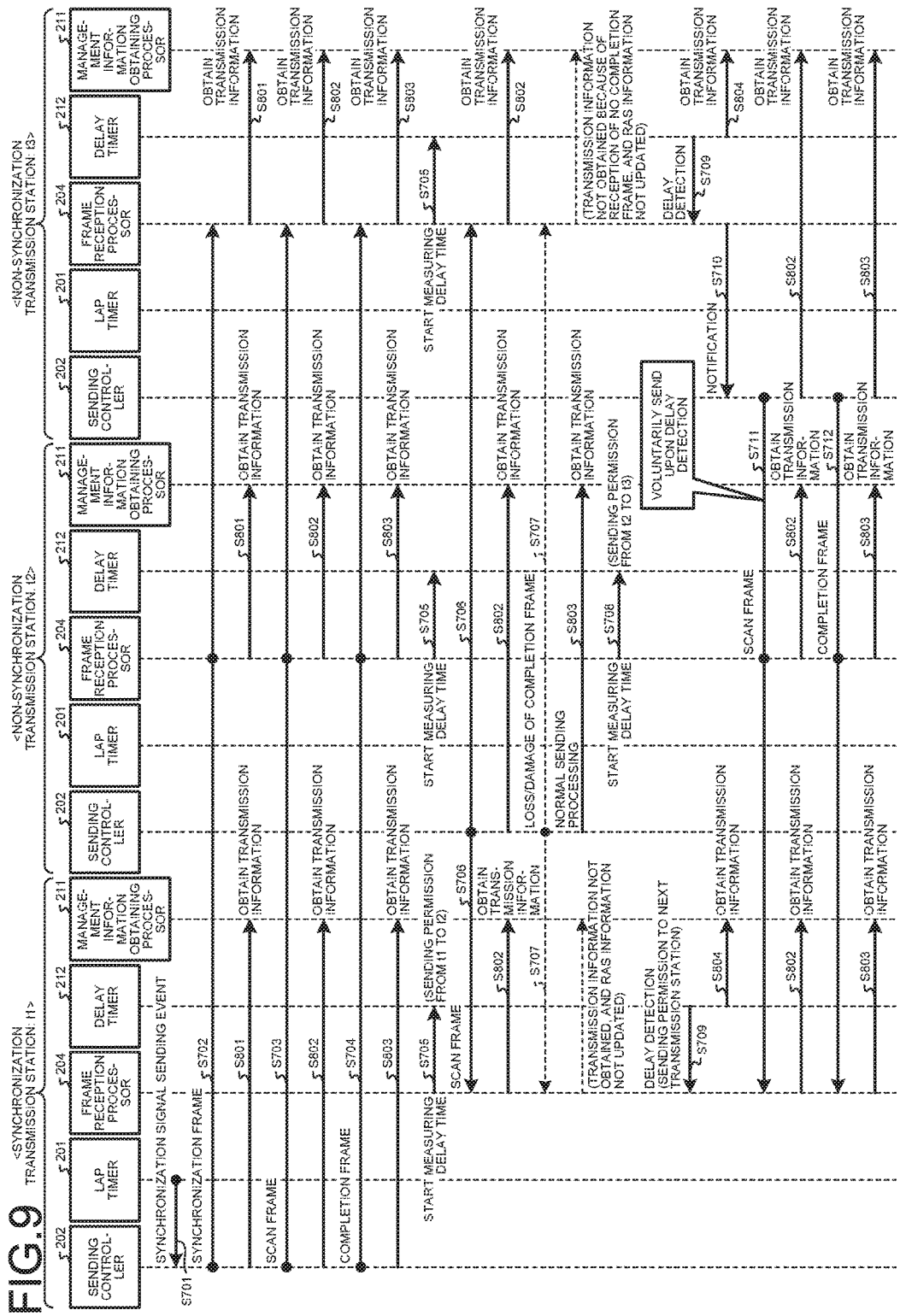

FIG.10A

| NUMBER OF SENT FRAMES | TRANSMISSION STATION t1 | TRANSMISSION STATION t2 | TRANSMISSION STATION t3 |
|---|---|---|---|
| PREVIOUS VALUE | 6 | 7 | 8 |
| LATEST VALUE | 7 | 8 | 9 |
| DIFFERENCE | 1 | 1 | 1 |

NORMAL: DIFFERENCE ≥ 1

FIG.10B

| NUMBER OF RECEIVED FRAMES | TRANSMISSION STATION t1 | TRANSMISSION STATION t2 | TRANSMISSION STATION t3 |
|---|---|---|---|
| PREVIOUS VALUE | 15 | 14 | 13 |
| LATEST VALUE | 15 | 15 | 13 |
| DIFFERENCE | 0 | 1 | 0 |
| | ABNORMAL | NORMAL | ABNORMAL |

FIG.11

| | TRANSMISSION STATION t1 | TRANSMISSION STATION t2 | TRANSMISSION STATION t3 |
|---|---|---|---|
| NUMBER OF DELAY DETECTIONS | 1 | 0 | 1 |

FIG.12

|  | TRANSMISSION STATION t1 | TRANSMISSION STATION t2 | ... | TRANSMISSION STATION tn |
|---|---|---|---|---|
| CORRECT ANSWER VALUE | 9 | 8 | ... | 8 |
| NUMBER OF EXECUTIONS | 9 | 7 | ... | 8 |
| DETERMINATION | NORMAL | ABNORMAL | ... | NORMAL |

FIG.13

| DA | SA | TYPE | IP HEADER | TCP/UDP HEADER | RAS INFORMATION | FCS |
|---|---|---|---|---|---|---|

FIG.17

```
<SENDING INFORMATION>
CYCLE A, SENDING TIME, FRAME TYPE, SENDING SOURCE,
SENDING DESTINATION, MANAGEMENT INFORMATION A, B, C ···
CYCLE A, SENDING TIME, FRAME TYPE, SENDING SOURCE,
SENDING DESTINATION, MANAGEMENT INFORMATION A, B, C ···
           .
CYCLE B, SENDING TIME, FRAME TYPE, SENDING SOURCE,
SENDING DESTINATION, MANAGEMENT INFORMATION A, B, C ···
           .
   (NUMBER OF CYCLES IN TRANSMISSION PERIOD)
```

```
<RECEPTION INFORMATION: TRANSMISSION STATION t1>
CYCLE A, RECEPTION TIME, FRAME TYPE, SENDING SOURCE,
SENDING DESTINATION, MANAGEMENT INFORMATION A, B, C ···
CYCLE A, RECEPTION TIME, FRAME TYPE, SENDING SOURCE,
SENDING DESTINATION, MANAGEMENT INFORMATION A, B, C ···
           .
CYCLE B, RECEPTION TIME, FRAME TYPE, SENDING SOURCE,
SENDING DESTINATION, MANAGEMENT INFORMATION A, B, C ···
           .
   (NUMBER OF CYCLES IN TRANSMISSION PERIOD)
```

⋮

```
<RECEPTION INFORMATION: TRANSMISSION STATION tn>
CYCLE A, RECEPTION TIME, FRAME TYPE, SENDING SOURCE,
SENDING DESTINATION, MANAGEMENT INFORMATION A, B, C ···
CYCLE A, RECEPTION TIME, FRAME TYPE, SENDING SOURCE,
SENDING DESTINATION, MANAGEMENT INFORMATION A, B, C ···
           .
CYCLE B, RECEPTION TIME, FRAME TYPE, SENDING SOURCE,
SENDING DESTINATION, MANAGEMENT INFORMATION A, B, C ···
           .
   (NUMBER OF CYCLES IN TRANSMISSION PERIOD)
```

TRANSMISSION SYSTEM FOR CONTROLLING CONTROL/MONITORING TARGETS AND TRANSMISSION STATION FOR CONTROLLING CONTROL/MONITORING TARGETS

CROSS-REFERENCE TO RELATED APPLICATIONS

This application is national stage application of International Application No. PCT/JP2015/085554, filed Dec. 18, 2015, which designates the United States, incorporated herein by reference, and which claims the benefit of priority from Japanese Application No. 2015-056864, filed on Mar. 19, 2015, the entire contents of which are incorporated herein by reference.

FIELD

Embodiments of described herein relate generally to a transmission system and a transmission station.

BACKGROUND

Local area network (LAN) application focused on an information processing system has been dramatically developed. Among others, a network focused on the Ethernet (registered trademark) or the IEEE 802.3 Ethernet (hereinafter collectively referred to as the "Ethernet") has been dramatically developed, and has spread not only to the information processing system but also to a monitoring control system. Further, due to improvement of performance such as a transmission speed and a communication processing function and price reduction in association with mass production of standard products, the network focused on the Ethernet has been surely developed.

The Ethernet having a 10 Mbps bus type transmission path and the Ethernet having a star type transmission path with a combination of a hub, a repeater, and a switching hub can be currently utilized by a combination of products with transmission speeds of 10 Mbps, 100 Mbps, and 1 Gbps.

Although future application of the Ethernet has been expected, a carrier sense multiple access/collision detection (CSMA/CD) method has been used as the method for controlling transmission of a communication frame among transmission stations under existing circumstances. Due to fundamental principles of such a method, a waiting time until the communication frame is reliably delivered onto the transmission path cannot be accurately predicted no matter how much the transmission speed increases.

Specifically, in the CSMA/CD method, each transmission station monitors a carrier on the transmission path, and starts delivering the communication frame when no communication frame is not delivered onto the transmission path for a certain period of time and there is a free space on the transmission path. On the other hand, in the CSMA/CD method, when there is no free space on the transmission path, delivery of the communication frame is delayed until the free space can be ensured on the transmission path. Further, in the CSMA/CD method, even when one transmission station starts delivering the communication frame, if occurrence of interference with another transmission station having simultaneously started delivering the communication frame is detected, delivery of the communication frame from the one transmission station is interrupted, and then, is resumed with a predetermined time delay.

Thus, in the CSMA/CD method, when the use rate of the transmission path by each transmission station increases, interference among the transmission stations is inevitably caused often. Further, the state in which the communication frame cannot be delivered lasts for all time. That is, in the CSMA/CD method, the waiting time until delivery of the communication frame is probabilistic. For this reason, employment of the CSMA/CD method is limited in the intended use for control requiring so-called real-time performance, such as the control of object movement or a process, by information exchange among transmission stations within a required time.

In the monitoring control system employing the CSMA/CD method, a countermeasure is also taken in such a manner that a system design is, regardless of high-speed transmission performance, made with such a sufficient allowance that occurrence of interference among the transmission stations can be ignored by reduction in a total traffic amount in information exchange among the transmission stations or the number of transmission stations in a transmission system, or made with further adjustment according to an operation status.

For realizing the real-time performance allowing reliable information exchange among the transmission stations within the certain period of time, a transmission system has been proposed, which is, by an implicit method not including explicit token exchange as in a token passing method represented by IEEE 802.4, configured as if the token passing method is realized.

In a transmission station (hereinafter referred to as a "data transmission station") of this transmission system, an Ethernet transmission control Large Scale Integration (LSI) is utilized. A special signal pattern for the Ethernet transmission control is added to a frame format provided by the Ethernet. Using a synchronization frame delivered by a particular transmission station as the timing of starting token passing, each transmission station sequentially delivers a communication frame subsequently after the synchronization frame. This realizes a so-called implicit (implicit logic) token passing method in which occurrence of interference among the transmission stations as a drawback of the CSMA/CD method is reduced.

LSIs, connectors, cables, software resources, etc. forming the Ethernet can be utilized in this transmission system, but a signal sequence transmitted on a transmission path is different from the frame format provided by the Ethernet. For this reason, in a transmission system configured according to Ethernet standards, even if data transmission stations were mixed with Ethernet equipment such as a repeater, a hub, or a switching hub and transmission stations (hereinafter referred to as "Ethernet transmission stations") according to the Ethernet standards, the implicit token passing method cannot be performed, and information exchange among the data transmission stations and the Ethernet transmission stations cannot be performed. That is, the transmission system including the data transmission stations leaves no other alternative but to serve as an independent transmission system for exclusive use.

For this reason, in a transmission system configured such that a plurality of transmission stations are connected together via a transmission path and each transmission station sends/receives a communication frame according to the Ethernet standards, a technique is employed, which can realize the implicit token passing method using some of the transmission stations as synchronization transmission stations configured to periodically output the timing of starting implicit token passing. According to such a technique, the data transmission stations can be connected to the transmission path including the Ethernet equipment. Thus, the transmission system can be provided with the real-time performance for realizing not only information exchange among the data transmission stations and the Ethernet transmission stations but also transmission of the communication frame within a preset time.

In the above-described technique, when an abnormality is caused in a repeater, a hub, a switching hub, a LAN controller, etc. on the transmission path, the abnormality in transmission of the communication frame might be detected in multiple transmission stations, and for this reason, it takes time to diagnose an actual abnormal portion. The method for solving such a problem may include a method in which an abnormality in various types of equipment of a transmission system is monitored by a simple network management protocol (SNMP).

However, in this method, a SNMP agent needs to be disposed at each transmission station in the transmission system. Moreover, transmission processing by the implicit token passing method is not taken into consideration, and therefore, this influences reliable transmission processing within a certain period of time. Further, the SNMP agent collects information in the transmission station at the timing different from the timing of transmitting the communication frame in the implicit token passing method. For this reason, when the abnormality is caused across multiple transmission stations, the actual abnormal portion cannot be diagnosed.

BRIEF DESCRIPTION OF DRAWINGS

FIG. 3A is a diagram of an example of a data format of a synchronization frame transmitted in the transmission system of the first embodiment;

FIG. 3B is a diagram of an example of a data format of a scan frame transmitted in the transmission system of the first embodiment;

FIG. 3C is a diagram of an example of a data format of a completion frame transmitted in the transmission system of the first embodiment;

FIG. 4 is a table of an example of a data configuration of transmission station live information contained in the synchronization frame transmitted in the transmission system of the first embodiment;

FIG. 5 is a diagram of an example of scan data contained in the scan frame transmitted in the transmission system of the first embodiment;

FIG. 6 is a diagram of an example of RAS information obtained in the transmission station of the transmission system of the first embodiment;

FIG. 9 is a sequence diagram of an example of the flow of the processing of obtaining transmission information in the transmission system of the first embodiment;

FIG. 10A is a table for describing the processing of detecting an abnormality in sending or reception of the communication frame in the transmission system of the first embodiment;

FIG. 10B is a table for describing the processing of detecting the abnormality in sending or reception of the communication frame in the transmission system of the first embodiment;

FIG. 11 is a table for describing the processing of detecting the abnormality in sending or reception of the communication frame by means of the number of delay detections in the transmission system of the first embodiment;

FIG. 12 is a table for describing the processing of detecting the abnormality in sending or reception of the communication frame by means of the number of executions in the transmission system of the first embodiment;

FIG. 13 is a diagram of an example of a data configuration of the RAS information sent to a management station of the transmission system of the first embodiment;

FIG. 17 is a diagram for describing an example of the method for storing the RAS information by the management station of the transmission system of the first embodiment;

DETAILED DESCRIPTION

In general, an according to embodiments, a transmission system is a transmission system including a plurality of transmission stations connected together via a single transmission path. Each transmission station includes a sending controller, an obtaining unit, and a first storage. The sending controller is configured to sequentially obtain a sending permission subsequently after a synchronization frame sent by a predetermined transmission station of a plurality of transmission stations in a predetermined transmission period, and sends a communication frame to other transmission stations. The obtaining unit is configured to obtain first information regarding sending or reception of a communication frame in synchronization with sending or reception of the communication frame. The first storage is configured to store the first information and second information indicating the date and time of obtaining the first information.

A transmission system and a transmission station according to the present embodiments will be described below with reference to the attached drawings.

First Embodiment

Figure 1:
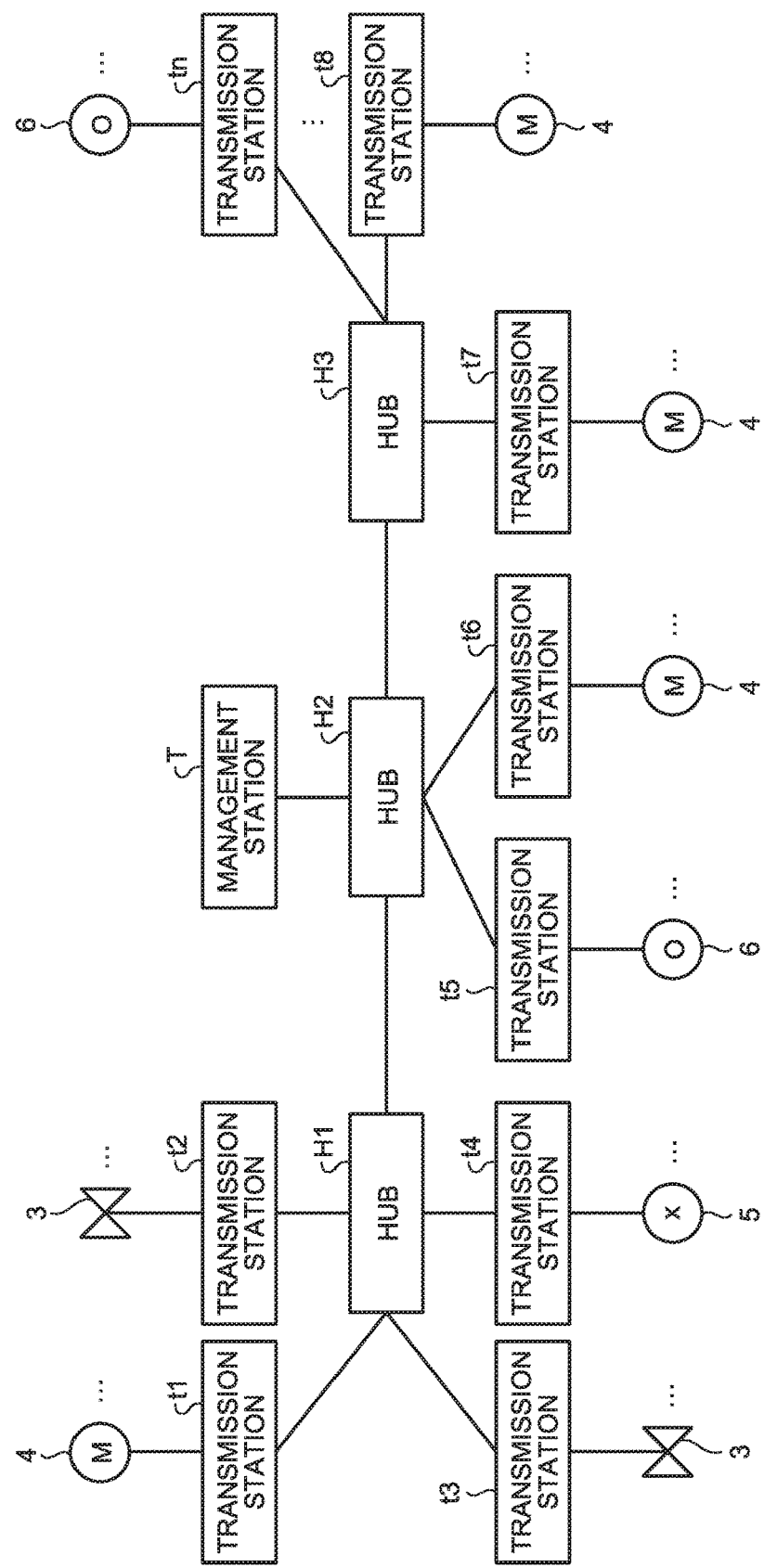
FIG. 1 is a diagram of a configuration of a transmission system of a first embodiment.

FIG. 1 is a diagram of a configuration of a transmission system of a first embodiment. As illustrated in FIG. 1, the transmission system of the present embodiment includes a plurality of transmission stations t1, t2, . . . , tn (hereinafter referred to as a "transmission station(s) t" when it is not necessary to distinguish the transmission stations t1, t2, . . . , tn from each other); control/monitoring targets to be controlled by the transmission stations t, such as a valve 3, a motor 4, a lamp 5, and a switch 6; hubs H1, H2, H3 (hereinafter referred to as a "hub(s) H" when it is not necessary to distinguish the hubs H1, H2, H3 from each other) configured to connect among the transmission stations t; and a management station T (an example of a first device) configured to perform, e.g., detection of the state of each transmission station t, various settings for each transmission station t, and storage of software to be executed in each transmission station.

In the present embodiment, the transmission stations t1, t6, t7, t8 target motor 4 for the control/monitoring target. Moreover, the transmission stations t2, t3 target the value 3 for the control/monitoring target. Further, the transmission station t4 targets the lamps for the control/monitoring target. In addition, the transmission stations t5, tn target the switch 6 for the control/monitoring target.

In the present embodiment, the transmission stations t are connected together via the hubs H on a transmission path according to Ethernet standards, and exchanges a communication frame among the transmission stations t to share various types of information. Moreover, the transmission stations t and the management station T are also connected together via a transmission path physically different from the transmission path for exchange of the communication frame among the transmission stations t or a transmission path quality-of-service (QoS) controlled via, e.g., a virtual local area network (VLAN). That is, the transmission stations t and the management station T are connected together via the real-time control system transmission path used for exchange of the communication frame among the transmission stations t and the non-real-time information system transmission path different from the control system transmission path.

Moreover, in the present embodiment, the transmission system is configured such that some of the transmission stations t set in advance serve as synchronization transfer stations t (an example of a predetermined transmission station) each configured to send, in a predetermined transmission period, a synchronization frame SYN for synchronization of start timing of so-called implicit token passing. The implicit token passing method described herein is the following method: each transmission station t sequentially obtains a sending permission (a token) subsequently after the synchronization frame SYN sent from the synchronization transmission station t, and then, sends the communication frame such as a scan frame SCN and a completion frame CMP indicating completion of sending of the scan frame SCN. In the present embodiment, the synchronization frame SYN includes information indicating the transmission stations t for exchange of the communication frame by the implicit token passing method.

In the present embodiment, the transmission system may determine, using an Internet protocol address (an IP address) or a media access control address (a MAC address) as an example of ID information for identification of each transmission station t, the transmission station t indicated by the ID information input by, e.g., a manager of the transmission system as the synchronization transmission station t, or may determine, as the synchronization transmission station t, the transmission station t corresponding to leading one of ID information pieces on the transmission stations t, the ID information pieces being arranged in ascending or descending order. Subsequently after the synchronization frame SYN sent from the synchronization transmission station t, the synchronization transmission station t and non-synchronization transmission stations t as other transmission stations t than the synchronization transmission station t sequentially obtain the sending permission, and send the communication frame to other transmission stations t.

Figure 2:
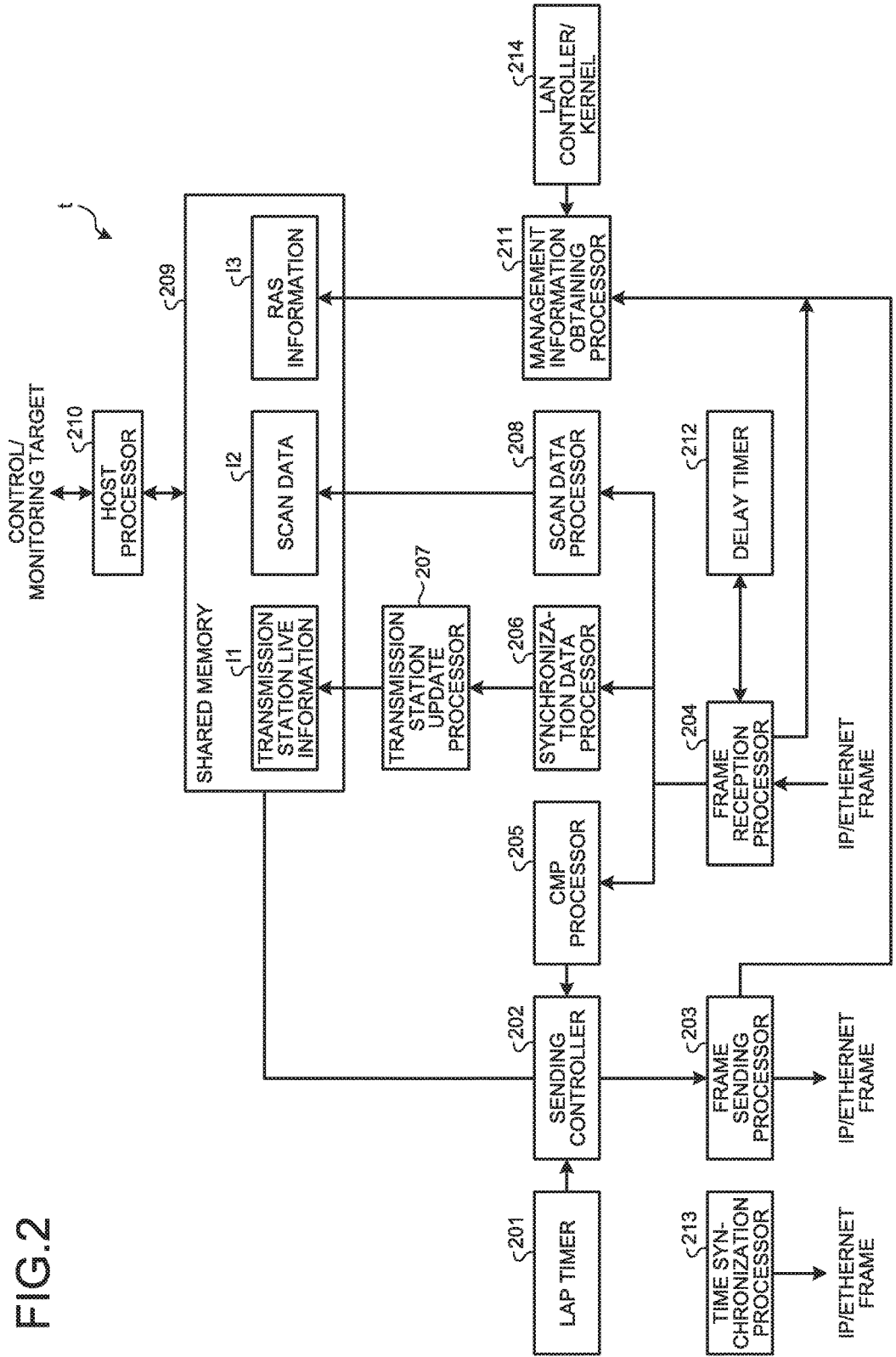
FIG. 2 is a block diagram of an example of a functional configuration of a transmission station in the transmission system of the first embodiment.

FIG. 2 is a block diagram of an example of a functional configuration of the transmission station in the transmission system of the first embodiment. As illustrated in FIG. 2, the transmission station t includes, in the present embodiment, a lap timer 201, a sending controller 202, a frame sending processor 203, a frame reception processor 204, a CMP processor 205, a synchronization data processor 206, a transmission station update processor 207, a scan data processor 208, a shared memory 209, a host processor 210, a management information obtaining processor 211, a delay timer 212, and a time synchronization processor 213.

The shared memory 209 is configured to store data shared by the transmission stations t, such as transmission station live information I1, scan data I2, and Reliability Availability Serviceability (RAS) information I3. The transmission station live information I1 described herein is information indicating the transmission stations t for exchange of the communication frame by the implicit token passing method. The scan data I2 is information which can be utilized by the transmission stations t depending on the intended use such as the control/monitoring target. The RAS information I3 includes transmission information (an example of first information) on transmission of the communication frame among the transmission stations t, and date-and-time information (an example of second information) indicating the date and time of obtaining the transmission information.

The host processor 210 is configured to exchange the shared data stored in the shared memory 209 with the management station T as host equipment. A LAN controller/kernel 214 is configured to obtain management information on the communication frame sent/received by each transmission station t, such as the total number of communication frames (hereinafter referred to as "the number of sent frames) sent by the transmission stations t, the total number of communication frames (hereinafter referred to as "the number of received frames") received by the transmission stations t, and the packet number or error count number of the communication frame sent/received by each transmission station t.

The time synchronization processor 213 is configured to synchronize a current time measured in the transmission station t with a master time measured in the management station T. The lap timer 201 is configured to generate a synchronization signal sending event for instructing sending of the synchronization frame SYN in the predetermined transmission period. The sending controller 202 of the transmission station t is configured to control, every time the synchronization signal sending event is generated by the lap timer 201, the frame sending processor 203 to send the synchronization frame SYN. Note that the sending controller 202 of the non-synchronization transmission station does not send the synchronization frame SYN.

Moreover, the sending controller 202 is configured to control the frame sending processor 203 to obtain the sending permission in preset order subsequently after the synchronization frame SYN sent by the synchronization transmission station t, thereby sending the communication frame such as the scan frame SCN and the completion frame CMP to other transmission stations t. In the present embodiment, when the synchronization frame is sent by the synchronization transmission station t or the later-described CMP processor 205 notifies reception of the completion frame CMP (i.e., every time sending of the communication frame by any of the transmission stations t has completed), the sending controller 202 refers to the transmission station live information I1 stored in the shared memory 209, thereby determining whether or not the transmission station t of such a sending controller 202 itself obtains the sending permission. Then, when it is determined that the transmission station t of the sending controller 202 itself obtains the sending permission, the sending controller 202 sends the communication frame. On the other hand, when it is determined that the transmission station t of the sending controller 202 itself does not obtain the sending permission, the sending controller 202 does not send the communication frame, and then, transfers the sending permission to other transmission stations t.

The frame sending processor 203 is controlled by the sending controller 202, and send the communication frame such as the synchronization frame SYN, the scan frame SCN, and the completion frame CMP. The frame reception processor 204 is configured to receive the communication frame such as the synchronization frame SYN, the scan frame SCN, and the completion frame CMP.

Moreover, when a delay time measured by the later-described delay timer 212 exceeds a predetermined acceptable delay time, the frame reception processor 204 takes such a state as completion of reception of the communication frame, and then, notifies, via the CMP processor 205, the sending controller 202 that the completion frame CMP has been received. The predetermined acceptable delay time described herein is a preset time, and is an acceptable upper time limit for reception of a single communication frame. Thus, even when reception of the communication frame has not been completed yet, if the delay time exceeds the predetermined acceptable delay time and it is determined that the transmission station t of the sending controller 202 itself obtains the sending permission, the sending controller 202 voluntarily sends the communication frame. With this configuration, transmission of the communication frame is continued even when, e.g., loss or damage of the communication frame is caused on the transmission path, and therefore, stoppage of a communication frame transmission sequence can be prevented.

The CMP processor 205 is configured to notify the sending controller 202 that the completion frame CMP has been received every time the completion frame CMP is received from the frame reception processor 204. The synchronization data processor 206 is configured to instruct the later-described transmission station update processor 207 to update the transmission station live information I1 every time the synchronization frame SYN is received by the frame reception processor 204. The transmission station update processor 207 is configured to update, according to the transmission station live information I1 contained in the lastly-received synchronization frame SYN, the transmission station live information I1 stored in the shared memory 209 every time update of the transmission station live information I1 is instructed from the synchronization data processor 206.

The scan data processor 208 is configured to save, in the shared memory 209, the scan data I2 contained in the scan frame SCN received by the frame reception processor 204. The delay timer 212 (an example of a measurement unit) is configured to measure the delay time (an example of a first time) as a time (in other words, the interval of receiving the communication frame) elapsed without reception of the subsequent completion frame CMP after last reception of the completion frame CMP by the frame reception processor 204.

The management information obtaining processor 211 (an example of an obtaining unit) is configured to obtain, from the frame sending processor 203, the frame reception processor 204, the LAN controller/kernel 214, etc., the transmission information on sending and reception of the communication frame by the transmission station t in synchronization with sending or reception of the communication frame. The management information obtaining processor 211 is configured to save, in the shared memory 209 (an example of a first storage), the RAS information I3 including the obtained transmission information and the date-and-time information indicating the date and time of obtaining the transmission information. Moreover, when the delay time measured by the delay timer 212 exceeds the predetermined acceptable delay time, the management information obtaining processor 211 also takes such a state as reception of the communication frame, and obtains the transmission information.

With this configuration, the transmission information is obtained without providing an SNMP agent, and therefore, influence of abnormality monitoring by the SNMP agent on transmission of the communication frame can be prevented. Moreover, the transmission information is obtained in synchronization with the timing of transmitting the communication frame, and therefore, an actual abnormal portion can be diagnosed using the RAS information I3 even when an abnormality is caused across multiple transmission stations t.

FIG. 3A is a diagram of an example of a data format of the synchronization frame transmitted in the transmission system of the first embodiment. FIG. 3B is a diagram of an example of a data format of the scan frame transmitted in the transmission system of the first embodiment. FIG. 3C is a diagram of an example of a data format of the completion frame transmitted in the transmission system of the first embodiment. As illustrated in FIGS. 3A, 3B, and 3C, the synchronization frame SYN, the scan frame SCN, and the completion frame CMP are, in the present embodiment, in the data format according to an IP frame format. However, the present invention is not limited to such a configuration. For example, the synchronization frame SYN, the scan frame SCN, and the completion frame CMP may be in an Ethernet frame data format not including an IP header and a TCP/UDP header.

As illustrated in FIG. 3A, the synchronization frame SYN includes sending destination address data DA indicating a destination address (a MAC address) of the synchronization frame SYN, sending source address data SA indicating a sending source address (a MAC address) of the synchronization frame SYN, type data TYPE indicating the type of synchronization frame SYN, an IP header forming an IP packet, a TCP/UDP header including a TCP header or an UDP header forming a TCP packet or an UDP packet, the transmission station live information I1, and a frame check sequence (FCS).

As illustrated in FIG. 3B, the scan frame SCN includes sending destination address data DA indicating a destination address (a MAC address) of the scan frame SCN, sending source address data SA indicating a sending source address (a MAC address) of the scan frame SCN, type data TYPE indicating the type of scan frame SCN, an IP header forming an IP packet, a TCP/UDP header including a TCP header or an UDP header forming a TCP packet or an UDP packet, the scan data I2, and an FCS.

Moreover, as illustrated in FIG. 3C, the completion frame CMP includes sending destination address data DA indicating a destination address (a MAC address) of the completion frame CMP, sending source address data SA indicating a sending source address (a MAC address) of the completion, frame CMP, type data TYPE indicating the type of completion frame CMP, an IP header forming an IP packet, a TCP/UDP header including a TCP header or an UDP header forming a TCP packet or an UDP packet, CMP information indicating completion of sending of the scan frame SCN, and an FCS. After having received the completion frame CMP, the transmission station t transfers the sending permission to other transmission stations t based on the transmission station live information I1.

FIG. 4 is a table of an example of a data configuration of the transmission station live information contained in the synchronization frame transmitted in the transmission system of the first embodiment. The transmission station live information I1 is information that the transmission stations t (in other words, the transmission stations t for exchange of the scan frame SCN by the implicit token passing method) participating in the network can be identified. In the present embodiment, the transmission station live information I1 indicates, in a bitmap format, the transmission stations t participating in the network. Moreover, as illustrated in FIG. 4, the synchronization frame SYN includes, in the present embodiment, the transmission station live information I1 for the maximum constituent number as the upper limit of the number of transmission stations t participatable in the network to exchange the communication frame. With this configuration, the transmission station t having received the synchronization frame SYN can identify other transmission stations t participating in the network.

FIG. 5 is a diagram of an example of the scan data contained in the scan frame transmitted in the transmission system of the first embodiment. In the present embodiment, the scan frame SCN includes the scan data I2 stored in each transmission station t of the transmission system. In the present embodiment, the transmission station t sends the scan frame SCN including the scan data I2 stored in all of the transmission stations t of the transmission system, but the present invention is not limited to such a configuration. For example, the scan data I2 stored in each transmission station t may be divided, and the scan frame SCN including the scan data I2 stored in some of the transmission stations t may be sent.

FIG. 6 is a diagram of an example of the RAS information obtained in the transmission station of the transmission system of the first embodiment. As illustrated in FIG. 6, the transmission information contained in the RAS information I3 includes, in the present embodiment, sending information as information on sending of the communication frame in the transmission system, and reception information as information on reception of the communication frame in each transmission station t. The sending information described herein includes a sending time as the time of sending the communication frame at the transmission system, a frame type as the type of sent communication data, a sending source of the communication frame, a sending destination of the communication frame, and management information on the sent communication frame. In the present embodiment, the sending information includes the sending time, the frame type, the sending source, the sending destination, and the management information. However, the sending information may include some of the sending time, the frame type, the sending source, the sending destination, and the management information.

The reception information includes a reception time as the time of receiving the communication frame at the transmission station t, a frame type as the type of received communication frame, the sending source of the communication frame, the sending destination of the communication frame, and management information on the received communication frame. In the present embodiment, the reception information includes the reception time, the frame type, the sending source, the sending destination, and the management information. However, the reception information may include some of the reception time, the frame type, the sending source, the sending destination, and the management information.

Figure 7:
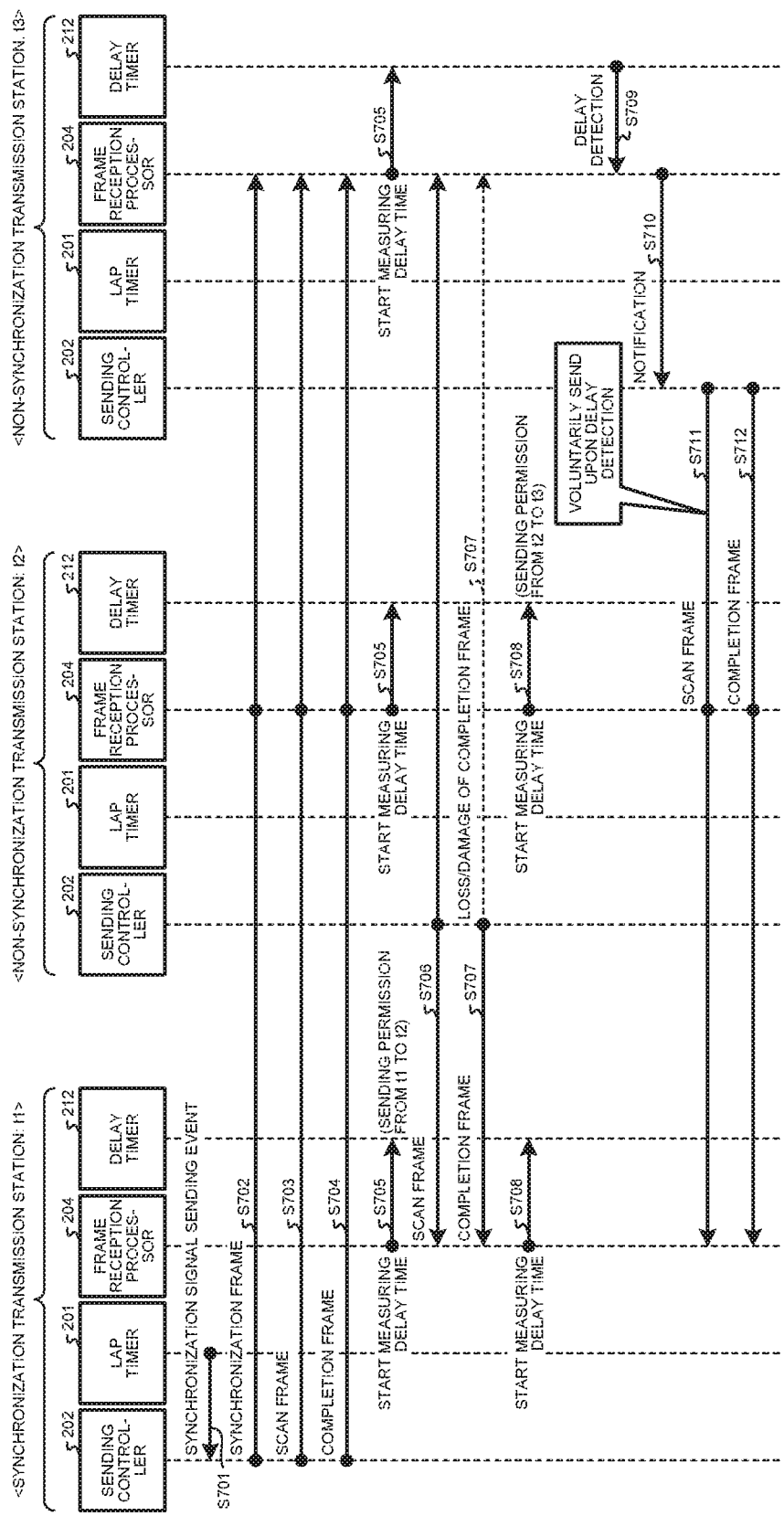
FIG. 7 is a sequence diagram of an example of the flow of the processing of sending a communication frame in the transmission system of the first embodiment.

Next, the processing of sending the communication frame in the transmission system of the present embodiment will be described with reference to FIG. 7. FIG. 7 is a sequence diagram of an example of the flow of the processing of sending the communication frame in the transmission system of the first embodiment. In the present embodiment, the transmission station t1 as the synchronization transmission station t is the transmission station t first obtaining the sending permission.

The lap timer 201 of the transmission station t1 generates the synchronization signal sending event in the predetermined transmission period (step S701). The sending controller 202 of the transmission station t1 sends the synchronization frame SYN to other transmission stations t2, t3 (the non-synchronization transmission stations) according to the synchronization signal sending event (step S702). Further, subsequently after sending of the synchronization frame SYN, the sending controller 202 of the transmission station t1 sends the scan frame SCN and the completion frame CMP to other transmission stations t2, t3 (steps S703, S704). After the completion frame CMP has been sent from the sending controller 202 of the transmission station t1, the frame reception processor 204 of each of the transmission stations t1, t2, t3 instructs the delay timer 212 to start measuring the delay time (step S705). Moreover, upon sending of the completion frame CMP, the sending permission of the communication frame is transferred to the subsequent non-synchronization transmission station t (e.g., the transmission station t2).

When the frame reception processor 204 of the transmission station t2 having obtained the sending permission after the transmission station t1 receives the completion frame CMP sent from the transmission station t1, the sending controller 202 sends the scan frame SCN and the completion frame CMP to other transmission stations t1, t3 (steps S706, S707). After the completion frame CMP has been sent from the sending controller 202 of the transmission station t2, the frame reception processor 204 of each of the transmission stations t1, t2, t3 resets the delay time measured by the delay timer 212, and instructs the delay timer 212 to start measuring the delay time again (step S708). Moreover, upon sending of the completion frame CMP from the transmission station t2, the sending permission of the communication frame is transferred to the subsequent transmission station t3.

In this state, when the communication frame (the completion frame CMP) sent from the transmission station t2 to the transmission stations t1, t3 is, for example, lost or damaged on the transmission path, and therefore, is not received by the transmission stations t1, t3, the delay time measured by the delay timer 212 of each of the transmission stations t1, t3 exceeds the predetermined acceptable delay time. In this case, the delay timer 212 of each of the transmission stations t1, t3 notifies the frame reception processor 204 that a delay has been detected (step S709). When the delay timer 212 notifies detection of the delay, the frame reception processor 204 of each of the transmission stations t1, t3 takes such a state as reception of the completion frame CMP, and notifies the sending controller 202 that the completion frame CMP has been received (step S710).

Then, the sending controller 202 of the transmission station t3 having obtained the sending permission after the transmission station t2 voluntarily sends the scan frame SCN and the completion frame CMP to other transmission stations t1, t2 (steps S711, S712). That is, the sending controller 202 sends the communication frame such as the scan frame SCN and the completion frame CMP when the delay time exceeds the predetermined acceptable delay time and the transmission station t of the sending controller 202 itself has obtained the sending permission. With this configuration, when, e.g., loss or damage of the communication frame is caused on the transmission path, stoppage of the communication frame transmission sequence among the transmission stations t can be avoided.

Figure 8:
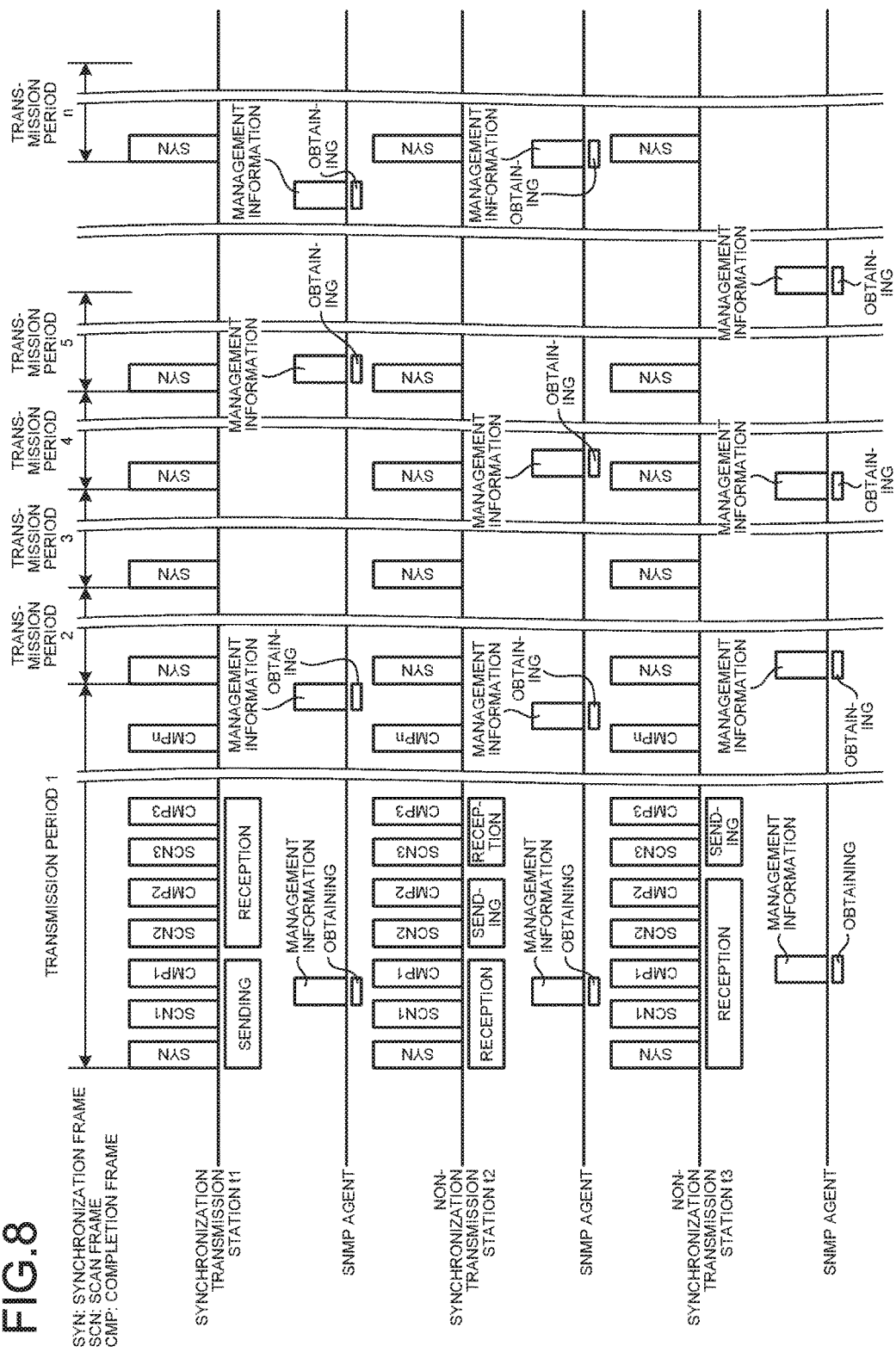
FIG. 8 is a diagram for describing the processing of obtaining management information in a transmission system including a SNMP agent.

Next, the processing of obtaining the management information when the SNMP agent is provided at the transmission system will be described with reference to FIG. 8. FIG. 8 is a diagram for describing the processing of obtaining the management information in the transmission system including the SNMP agent. As illustrated in FIG. 8, the SNMP agent is configured to obtain the management information in the period (hereinafter referred to as a "management information obtaining period") non-synchronizing a period of performing the processing of sending the communication frame by the implicit token passing method. For this reason, in the transmission system including the SNMP agent, when the abnormality is caused in transmission of the communication frame due to, e.g., loss of data or occurrence of an error in data, the processing of sending the communication frame cannot be diagnosed within the period of sending the communication frame. Further, when the transmission system has a topology via a hub or a repeater, it is difficult to identify timing, a device, and a port that the abnormality has been caused.

For these reasons, in the present embodiment, the management information obtaining processor 211 obtains the transmission information in synchronization with sending or reception of the communication frame (in other words, every time the communication frame is sent or received), and saves, in the shared memory 209, the RAS information I3 including the obtained transmission information and the date-and-time information indicating the date and time of obtaining the transmission information. Moreover, when the delay time exceeds the predetermined acceptable delay time and the communication frame cannot be received, the management information obtaining processor 211 takes such a state as reception of the communication frame, and obtains the transmission information. The transmission information is obtained without providing the SNMP agent, and therefore, influence of abnormality monitoring by the SNMP agent on transmission of the communication frame can be prevented. Moreover, the transmission information is obtained in synchronization with the timing of transmitting the communication frame, and therefore, the actual abnormal portion can be diagnosed using the RAS information I3 even when the abnormality is caused across multiple transmission stations t.

FIG. 9 is a sequence diagram of an example of the flow of the processing of obtaining the transmission information in the transmission system of the first embodiment. In description below, the same reference numerals as those of the processing of sending the communication frame as illustrated in FIG. 7 are used to represent similar elements, and description thereof will not be repeated.

In the present embodiment, the management information obtaining processor 211 of each transmission station t in the transmission system obtains the transmission information in synchronization with sending or reception of the communication frame, such as the synchronization frame SYN, the scan frame SCN, and the completion frame CMP, from the transmission station t in the transmission system (steps S801, S802, S803). Then, the management information obtaining processor 211 saves, in the shared memory 209 (the example of the first storage), the RAS information I3 including the obtained transmission information and the date-and-time information.

Suppose that the completion frame CMP sent by the sending controller 202 of the transmission station t2 is not received by the transmission stations t1, t3 due to, e.g., loss or damage on the transmission path (step S707). In this case, the sending controller 202 of the transmission station t2 normally sends the completion frame CMP. Thus, the management information obtaining processor 211 of the transmission station t2 obtains the transmission information different from that obtained upon sending of the scan frame SCN (step S803). Then, the management information obtaining processor 211 of the transmission station t2 obtains a difference between the transmission information obtained upon sending of the scan frame SCN and the currently-obtained transmission information. When it is confirmed that there is no difference, the management information obtaining processor 211 of the transmission station t2 determines that the completion frame CMP has been normally sent.

Meanwhile, the frame reception processor 204 of each of the transmission stations t1, t3 does not receive the completion frame CMP sent from the transmission station t2, and therefore, the management information obtaining processor 211 of each of the transmission stations t1, t3 cannot obtain the transmission information at proper timing (i.e., upon reception of the completion frame CMP). Moreover, since the completion frame CMP is not received, the transmission information contained in the latest RAS information I3 stored in the shared memory 209 is the transmission information contained in the non-updated RAS information I3 obtained upon previous reception of the scan frame SCN from the transmission station t2.

Subsequently, when the measured delay time exceeds the predetermined acceptable delay time, the delay timer 212 of each of the transmission stations t1, t3 detects a delay in reception of the completion frame CMP (step S709). When the delay in reception of the completion frame CMP is detected by the delay timer 212, the management information obtaining processor 211 of each of the transmission stations t1, t3 takes such a state as reception of the completion frame CMP, and obtains the transmission information (step S804).

Then, the management information obtaining processor 211 of each of the transmission stations t1, t3 obtains the difference between the previously-obtained transmission information and the currently-obtained transmission information. At this step, the completion frame CMP is not actually received by the transmission stations t1, t3, and therefore, the currently-obtained transmission information is the same as the previously-obtained transmission information. Thus, there is no difference between the previously-obtained transmission information and the currently-obtained transmission information, and therefore, the management information obtaining processor 211 of each of the transmission stations t1, t3 detects that there is an abnormality in reception of the communication frame.

Subsequently, when the delay timer 212 detects the delay in reception of the completion frame CMP, the frame reception processor 204 of the transmission station t1 inhibits sending of the communication frame by the sending controller 202 without notifying detection of the delay to the sending controller 202 of the transmission station t1, and in this manner, transfers the sending permission to the subsequent transmission station t3. Meanwhile, when the delay timer 212 detects the delay in reception of the completion frame CMP, the frame reception processor 204 of the transmission station t3 notifies the sending controller 202 of the transmission station t3 that the delay has been detected. Then, the sending controller 202 of the transmission station t3 voluntarily sends the scan frame SCN and the completion frame CMP to other transmission stations t1, t2 (steps S711, S712).

FIGS. 10A and 10B are tables for describing the processing of detecting the abnormality in sending or reception of the communication frame in the transmission system of the first embodiment. For example, when the frame sending processor 203 sends the communication frame, the management information obtaining processor 211 of each of the transmission stations t1, t2, t3 obtains a difference between the number of sent frames (a previous value) contained in the previously-obtained transmission information and the number of sent frames (a latest value) contained in the currently-obtained transmission information. Then, as illustrated in FIG. 10A, when the difference between the number of sent frames contained in the previously-obtained transmission information and the number of sent frames contained in the currently-obtained transmission information is greater than "1," the management information obtaining processor 211 determines that the communication frame has been normally sent.

Moreover, when the frame reception processor 204 receives the communication frame, the management information obtaining processor 211 of each of the transmission stations t1, t2, t3 obtains a difference between the number of received frames (a previous value) contained in the previously-obtained transmission information and the number of received frames (a latest value) contained in the currently-obtained transmission information. Then, as illustrated in FIG. 10B, when the difference between the number of received frames contained in the previously-obtained transmission information and the number of received frames contained in the currently-obtained transmission information is greater than "1," the management information obtaining processor 211 of the transmission station t2 determines that the communication frame has been normally received. On the other hand, as illustrated in FIG. 10B, when there is no difference between the number of received frames contained in the previously-obtained transmission information and the number of received frames contained in the currently-obtained transmission information, the management information obtaining processor 211 of each of the transmission stations t1, t3 determines that the abnormality is caused in reception of the communication frame.

In the present embodiment, the management information obtaining processor 211 detects, using the transmission information, that the abnormality is caused in sending or reception of the communication frame, but the present invention is not limited to such a configuration. For example, the management information obtaining processor 211 may measure the number of times (i.e., the number of delay detections in reception of the communication frame) that the delay time measured by the delay timer 212 exceeds the predetermined acceptable delay time, and may determine that the abnormality is caused in sending or reception of the communication frame when the number of delay detections exceeds the predetermined number of times. With this configuration, it can be, regardless of the transmission information, detected whether or not the abnormality is caused in sending or reception of the communication frame.

FIG. 11 is a table for describing the processing of detecting the abnormality in sending or reception of the communication frame by means of the number of delay detections in the transmission system of the first embodiment. For example, when the number of delay detections is a predetermined number of "0" as illustrated in FIG. 11, the management information obtaining processor 211 of the transmission station t2 determines that no abnormality is caused in sending or reception of the communication frame. On the other hand, when the number of delay detections exceeds the predetermined number of "0" as illustrated in FIG. 11, the management information obtaining processor 211 of each of the transmission stations t1, t3 determines that the abnormality is caused in sending or reception of the communication frame.

FIG. 12 is a table for describing the processing of detecting the abnormality in sending or reception of the communication frame by means of the number of executions in the transmission system of the first embodiment. In this case, the transmission system includes eight transmission stations t, and each transmission station t sends the communication frame once in every transmission period. Note that the transmission station t1 as the synchronization transmission station sends the synchronization frame SYN, and therefore, the number of executions is greater in the transmission station t1 than in other transmission stations t by one.

As the number of executions (nine) for obtaining the transmission information in every transmission period is, as illustrated in FIG. 12, equal to the correct answer value (nine) of the synchronization transmission station, the management information obtaining processor 211 of the transmission station t1 determines that no abnormality is caused in sending or reception of the communication frame. Moreover, as the number of executions (eight) for obtaining the transmission information in every transmission period is, as illustrated in FIG. 12, equal to the correct answer value (eight) of the non-synchronization transmission station, the management information obtaining processor 211 of the transmission station to determines that no abnormality is caused in sending or reception of the communication frame. On the other hand, as the number of executions (seven) for obtaining the transmission information in every transmission period is, as illustrated in FIG. 12, different from the correct answer value (eight) of the non-synchronization transmission station, the management information obtaining processor 211 of the transmission station t2 determines that the abnormality is caused in sending or reception of the communication frames.

Figure 14:
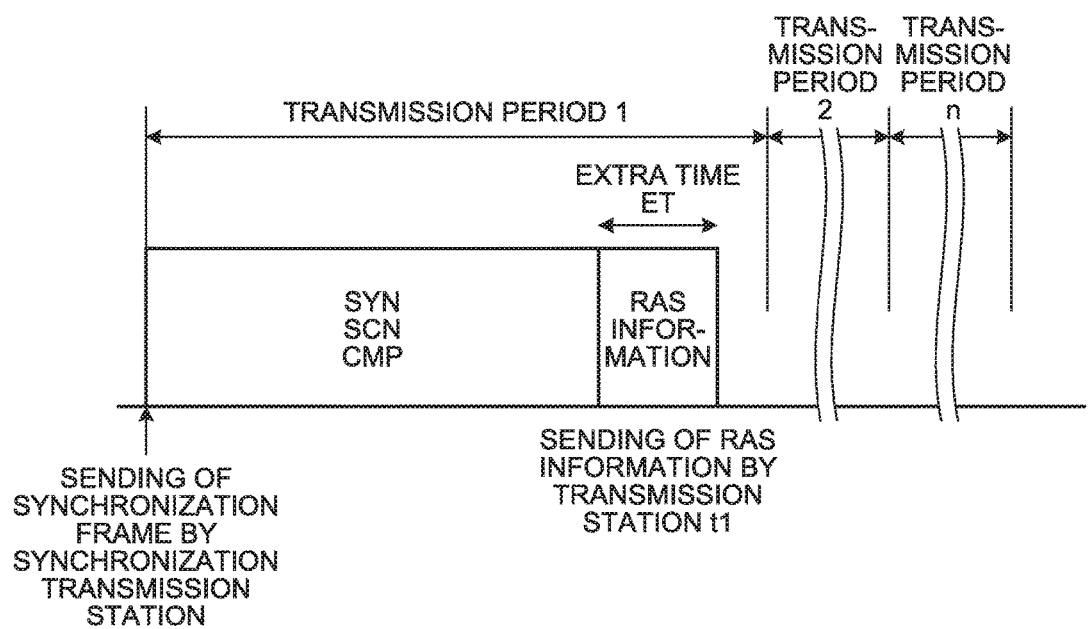
FIG. 14 is a sequence diagram of an example of the processing of sending the RAS information to the management station of the transmission system of the first embodiment.

Next, the processing of sending the RAS information I3 from the transmission station t to the management station T in the transmission system to allow sharing of the RAS information I3 between the management station T and the transmission station t will be described with reference to FIGS. 13 and 14. FIG. 13 is a diagram of an example of a data configuration of the RAS information sent to the management station of the transmission system of the first embodiment. FIG. 14 is a sequence diagram of an example of the processing of sending the RAS information to the management station of the transmission system of the first embodiment.

As illustrated in FIG. 14, the host processor 210 (an example of a communication unit) of at least one transmission station t (e.g., the transmission station t1) sends, in the present embodiment, the RAS information I3 saved in the shared memory 209 to the management station T during an extra time ET after completion of sending of the communication frame, such as the synchronization frame SYN, the scan frame SCN, and the completion frame CMP, by each transmission station t in the transmission period. In the present embodiment, the host processor 210 sends an RAS frame (an example of a first communication frame) to the management station T, the RAS frame being a communication frame with the RAS information I3 in the Ethernet frame data format as illustrated in FIG. 13.

As illustrated in FIG. 13, the RAS frame includes sending destination address data DA indicating a destination address (a MAC address) of the RAS frame, sending source address data SA indicating a sending source address (a MAC address) of the RAS frame, type data TYPE indicating the type of RAS frame, an IP header forming an IP packet, a TCP/UDP header including a TCP header or an UDP header forming a TCP packet or an UDP packet, the RAS information I3, and an FCS.

Figure 15:
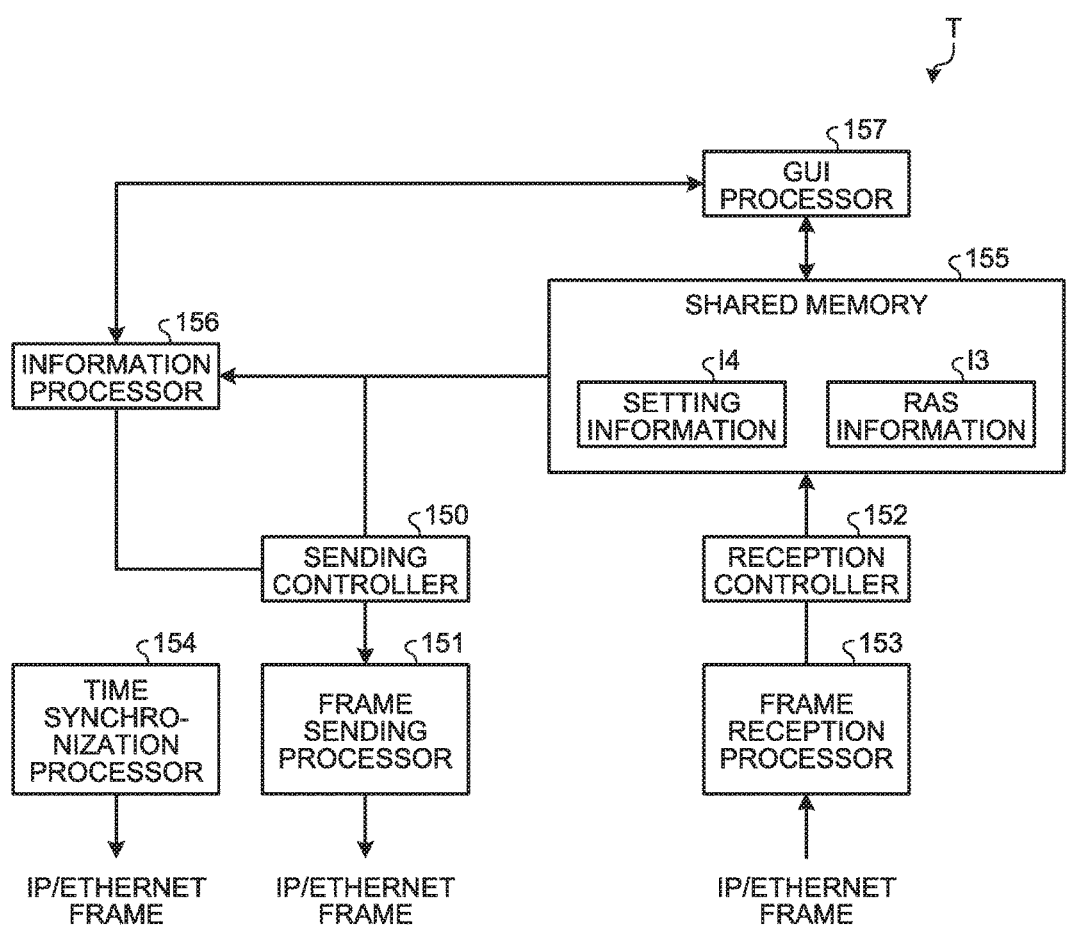
FIG. 15 is a block diagram of an example of a functional configuration of the management station in the transmission system of the first embodiment.

Next, a functional configuration of the management station T of the transmission system of the present embodiment will be described with reference to FIG. 15. FIG. 15 is a block diagram of an example of the functional configuration of the management station in the transmission system of the first embodiment.

As illustrated in FIG. 15, the management, station T includes, in the present embodiment, a sending controller 150, a frame sending processor 151, a reception controller 152, a frame reception processor 153, a time synchronization processor 154, a shared memory 155, an information processor 156, and a graphical user interface (GUI) processor 157.

The time synchronization processor 154 is configured to measure a time (a master time) as a reference for a time measured in the transmission station t. The sending controller 150 is configured to control the frame sending processor 151 to send the communication frame to the transmission station t. The frame sending processor 151 is controlled by the sending controller 150 such that the communication frame is sent to the transmission station t. The reception controller 152 is configured to control the frame reception processor 153 to receive the communication frame (e.g., the RAS frame) from the transmission station t. The frame reception processor 153 is controlled by the reception controller 152 such that the communication frame is received from the transmission station t.

The shared memory 155 (an example of a second storage) is configured to store various types of information such as the RAS information I3 contained in the RAS frame received from the transmission station t by the frame reception processor 153 and setting information I4 set to the transmission station t. The GUI processor 157 is configured to display, on a not-illustrated display, a user interface for performing various instructions such as the instruction of displaying various types of information stored in the shared memory 155. The information processor 156 is configured to execute various types of processing for the setting information I4 and the RAS information I3 stored in the shared memory 155.

Next, the processing of identifying an abnormality occurrence condition in sending or reception of the communication frame by the management station T of the transmission system of the present embodiment will be described with reference to FIG. 16. FIGS. 16A and 16B are a diagram and a graph for describing an example of the processing of identifying the abnormality occurrence condition in sending or reception of the communication frame by the management station of the transmission system of the first embodiment.

Figure 16A:
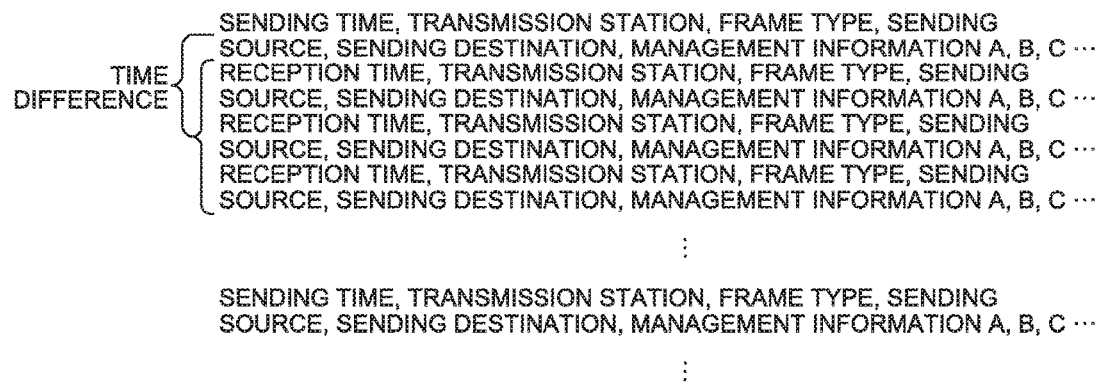
FIG. 16A is a diagram for describing an example of the processing of identifying an abnormality occurrence condition in sending or reception of the communication frame by the management station of the transmission system of the first embodiment.

In the present embodiment, the information processor 156 (an example of a processor) arranges, in chronological order, multiple pieces of the transmission information according to the date-and-time information contained in the RAS information I3, the transmission information being contained in the RAS information I3 stored in the shared memory 155, as illustrated in FIG. 16A. Then, the information processor 156 identifies the abnormality occurrence condition in sending or reception of the communication frame based on a transmission information arrangement result. With this configuration, occurrence of the abnormality in transmission of the communication frame can be identified in, e.g., any condition of sending of the communication frame, reception of the communication frame, and the state of not transmitting the communication frame.

Figure 16B:
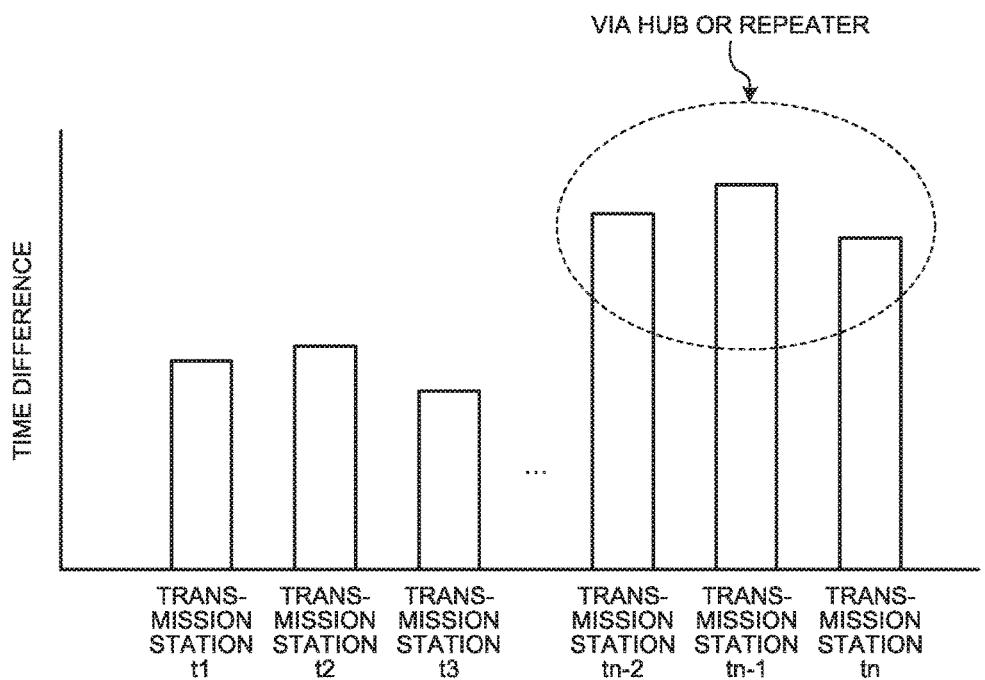
FIG. 16B is a graph for describing the example of the processing of identifying the abnormality occurrence condition in sending or reception of the communication frame by the management station of the transmission system of the first embodiment.

Moreover, the information processor 156 obtains, as illustrated in FIGS. 16A and 16B, a time difference (i.e., a time required for transmission of the communication frame) between a sending time of the communication frame by a certain transmission station t (e.g., the transmission station t1) and a reception time of communication frame by other transmission stations t (e.g., the transmission stations t2 to tn) based on a transmission information arrangement result. Then, the information processor 156 identifies, based on the obtained time difference, equipment (e.g., a hub or a repeater) through which the communication frame passes in transmission among the transmission stations t and a connection configuration (a topology) of the transmission stations t. With this configuration, lowering of the accuracy of detecting an error in implementation of a network configuration in the transmission system and the abnormality in sending or reception of the communication frame due to the equipment through which the communication frame passes and the connection configuration of the transmission stations t can be grasped.

As illustrated in FIG. 17, the information processor 156 saves, in a ring buffer format, the RAS information I3 for each transmission station t in the shared memory 155, the RAS information I3 corresponding to the predetermined number of cycles in the transmission period and being obtained from each transmission station t. Alternatively, the information processor 156 saves, in the ring buffer format, the RAS information I3 for each transmission station t in the shared memory 155, the RAS information I3 corresponding to the number of transmission stations t in the transmission system and being obtained from each transmission station t. With this configuration, the RAS information I3 saved in the shared memory 155 can be constantly maintained in a latest state, and the amount of RAS information I3 saved in the shared memory 155 can be reduced.

As described above, according to the transmission system of the first embodiment, the transmission information is obtained without providing the SNMP agent, and therefore, influence of abnormality monitoring by the SNMP agent on transmission of the communication frame can be prevented. Moreover, the transmission information is obtained in synchronization with the timing of transmission of the communication frame, and therefore, the actual abnormal portion can be diagnosed using the RAS information I3 even when the abnormality is caused across multiple transmission stations t.

Figure 18:
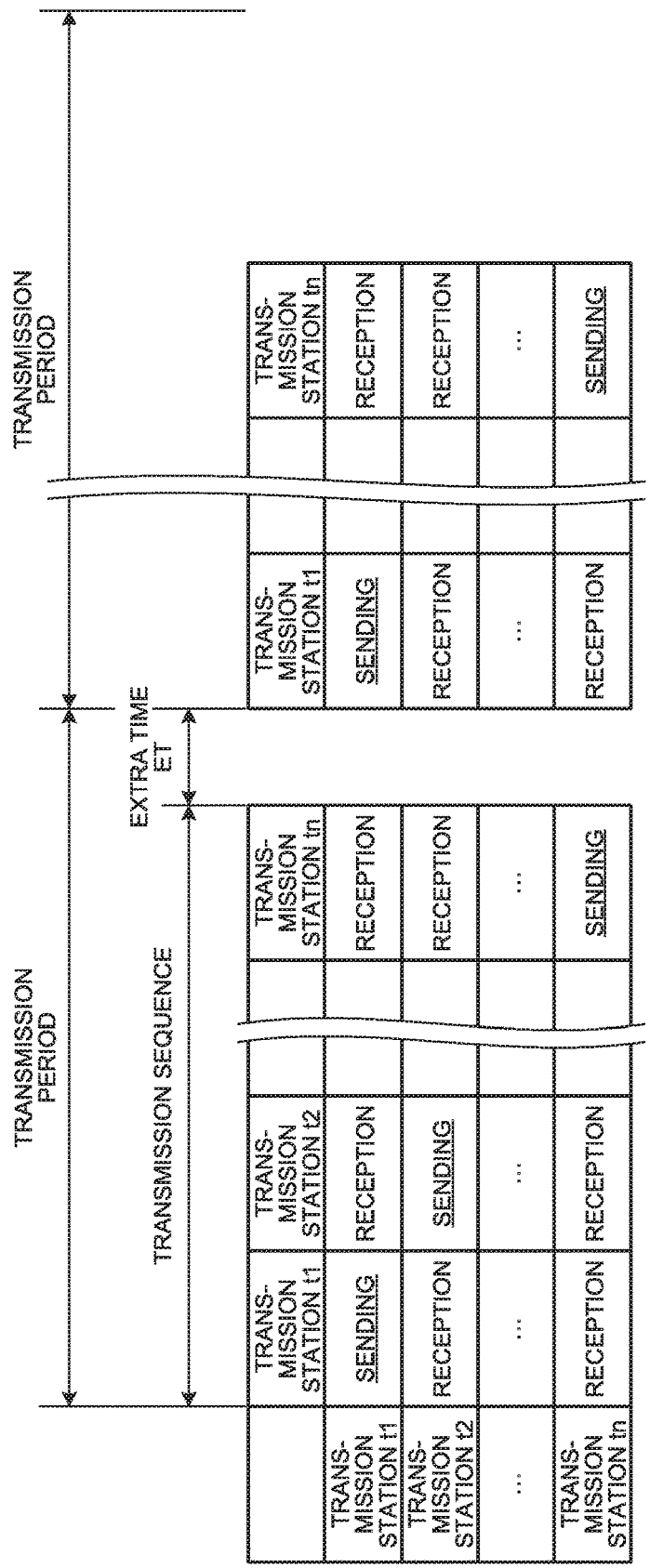
FIG. 18 is a table for describing another example of the processing of obtaining the transmission information in the transmission system of the first embodiment.

In the present embodiment, the management information obtaining processor 211 of each transmission station t obtains the transmission information in any of the case of sending the communication frame and the case of receiving the communication frame, but the present invention is not limited to such a configuration. The transmission information may be obtained only in either one of the case of sending the communication frame and the case of receiving the communication frame or only during the extra time ET after completion of sending/reception of the communication frame in the transmission period. FIG. 18 is a table for describing another example of the processing of obtaining the transmission information in the transmission system of the first embodiment. As illustrated in FIG. 18, the management information obtaining processor 211 of each transmission station t obtains the transmission information only upon sending of the communication frame. With this configuration, a processing overhead due to obtaining of the transmission information and the amount of obtained transmission information can be reduced.

Second Embodiment

The present embodiment is an example where RAS information is sent from one or more transmission stations to a management station according to an extra time after completion of sending/reception of a communication frame in a transmission period. In description below, points similar to those of the first embodiment will not be described.

Figure 19:
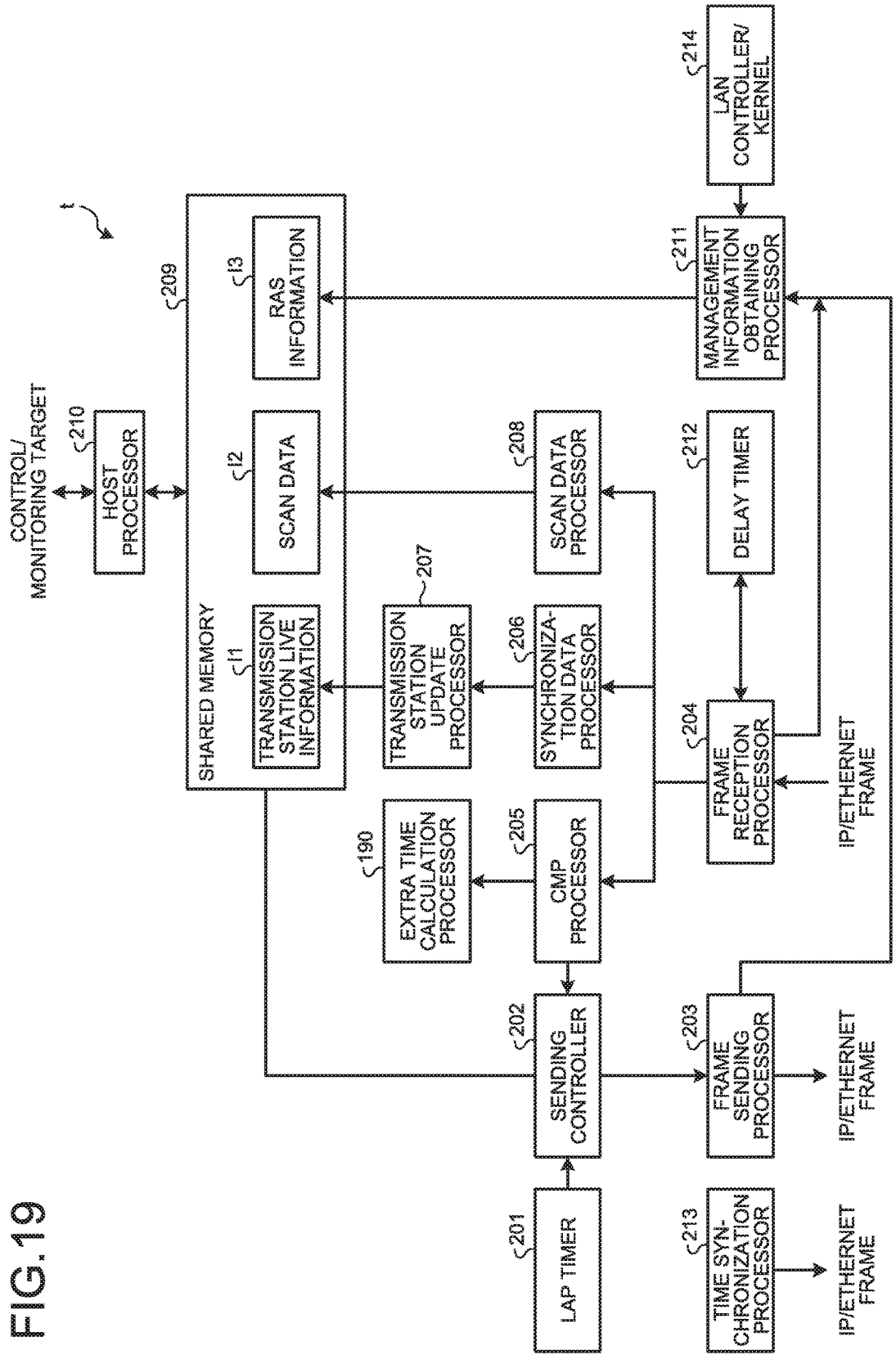
FIG. 19 is a block diagram of an example of a function configuration of a transmission station in a transmission system of a second embodiment.
Figure 20:
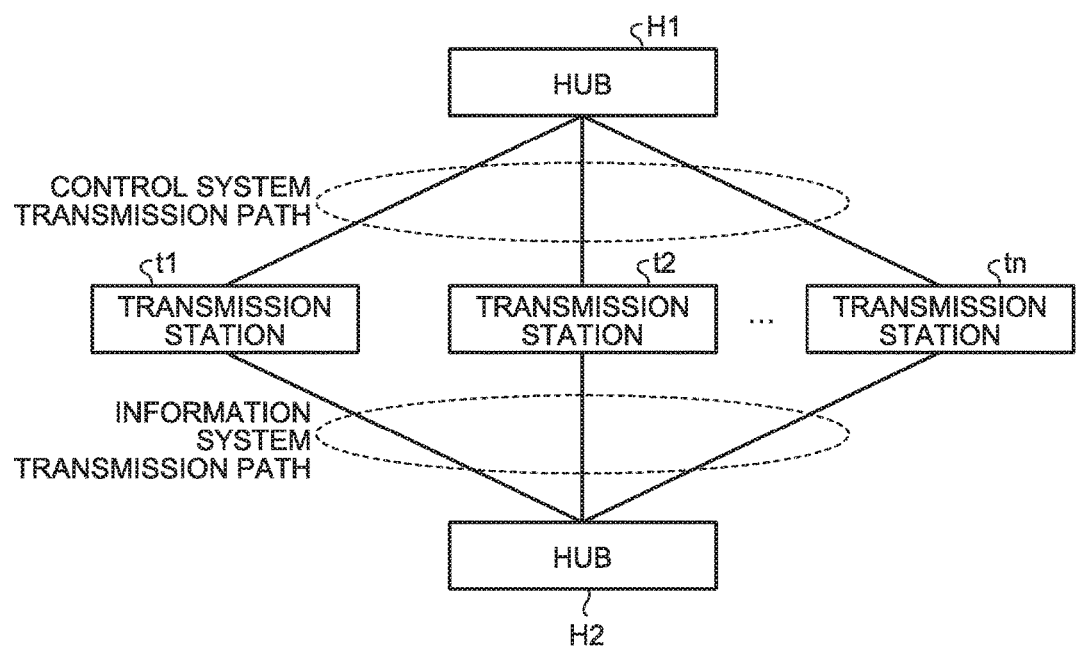
FIG. 20 is a diagram for describing an example of the processing of sending RAS information by the transmission station in the transmission system of the second embodiment.

FIG. 19 is a block diagram of an example of a function configuration of the transmission station in a transmission system of the second embodiment. FIG. 20 is a diagram for describing an example of the processing of sending the RAS information by the transmission station in the transmission system of the second embodiment. As illustrated in FIG. 19, the transmission station t includes, in the present embodiment, an extra time calculation processor 190 in addition to the function configuration of the transmission station t of the first embodiment. The extra time calculation processor 190 is configured to calculate an extra time ET after completion of sending/reception of the communication frame in the transmission period. In other words, the extra time calculation processor 190 calculates, as the extra time ET, a time until sending of a synchronization frame SYN from a synchronization transmission station after sending of a completion frame CMP from one of the transmission stations t lastly obtaining a sending permission.

A host processor 210 is configured to divide the calculated extra time ET by a communication time required for sending of the communication frame to the management station T. When the value obtained by division of the extra time ET by the communication time is equal to or greater than one, the host processor 210 sends, to the management station T, an RAS frame including RAS information I3 saved in a shared memory 209. With this configuration, the RAS information I3 can be sent to the management station T without influence on sending/reception of the communication frame by an implicit token passing method.

When the calculated extra time ET is shorter than the communication time required for sending of the communication frame to the management station T, the host processor 210 uses a transmission path (an information system transmission path) different from a transmission path (a control system transmission path) used for sending/reception of the communication frame by the transmission station t to send, to the management station T, the RAS frame including the RAS information I3 saved in the shared memory 209, as illustrated in FIG. 20. With this configuration, even when the extra time ET is shorter than the communication time, the RAS information I3 can be sent to the management station T without influence on sending/reception of the communication frame by the implicit token passing method using the control system transmission path.

As described above, according to the transmission system of the second embodiment, the RAS information I3 can be sent to the management station T without influence on sending/reception of the communication frame by the implicit token passing method.

As described above, according to the first and second embodiments, the actual abnormal portion can be diagnosed using the RAS information I3 even when the abnormality is caused across multiple transmission stations t.

Note that a program to be executed in the transmission station t and the management station T of the present embodiment is provided with the program being installed in advance in, e.g., a read only memory (ROM). The program to be executed in the transmission station t and the management station T of the present embodiment may be provided with the program being stored as an installable format file or an executable format file in a computer-readable storage medium such as a CD-ROM, a flexible disk (FD), a CD-R, or a digital versatile disk (DVD).

Alternatively, the program to be executed in the transmission station t and the management station T of the present embodiment may be stored on a computer connected to a network such as the Internet, and may be provided by downloading via the network. As another alternative, the program to be executed in the transmission station t and the management station T of the present embodiment may be provided or distributed via the network such as the Internet.

The program to be executed in the transmission station t of the present embodiment forms a module configuration including each unit described above (the lap timer 201, the sending control unit 202, the frame sending processor 203, the frame reception processor 204, the CMP processor 205, the synchronization data processor 206, the transmission station update processor 207, the scan data processor 208, the host processor 210, the management information obtaining processor 211, the delay timer 212, the time synchronization processor 213, the LAN controller/kernel 214, the extra time calculation processor 190). Each unit described above is, as actual hardware, loaded on a main storage device in such a manner that a central processing unit (CPU) reads and executes the program from the ROM. Thus, the lap timer 201, the sending control unit 202, the frame sending processor 203, the frame reception processor 204, the CMP processor 205, the synchronization data processor 206, the transmission station update processor 207, the scan data processor 208, the host processor 210, the management information obtaining processor 211, the delay timer 212, the time synchronization processor 213, the LAN controller/kernel 214, and the extra time calculation processor 190 are formed on the main storage device.

Moreover, the program to be executed in the management station T of the present embodiment forms a module configuration including each unit described above (the sending control unit 150, the frame sending processor 151, the reception controller 152, the frame reception processor 153, the time synchronization processor 154, the information processor 156, the GUI processor 157). Each unit described above is, as actual hardware, loaded on a main storage device in such a manner that a central processing unit (CPU) reads and executes the program from the ROM. Thus, the sending control unit 150, the frame sending processor 151, the reception controller 152, the frame reception processor 153, the time synchronization processor 154, the information processor 156, and the GUI processor 157 are formed on the main storage device.

Some embodiments of the present invention have been described. However, these embodiments have been set forth as examples, and are not intended to limit the scope of the invention. These new embodiments can be implemented in various other forms, and various omissions, replacements, and changes can be made without departing from the gist of the present invention. These embodiments and variations thereof are included in the scope and gist of the invention, and are included in the scope equivalent to that of the invention of the claims.

What is claimed is:

1. A transmission system for controlling control or monitoring targets comprising:
    a plurality of transmission stations connected together via a single transmission path,
    each transmission station including:
    a processor that:
        sequentially obtains a sending permission subsequently after a synchronization frame sent by a predetermined transmission station of a plurality of transmission stations in a predetermined transmission period;
        sends a communication frame to other ones of the transmission stations when the transmission station itself obtains the sending permission; and
        obtains first information regarding sending or reception of a communication frame in synchronization with the sending or reception of the communication frame; and
    a first storage that stores the first information and second information indicating date and time of obtaining the first information;
        wherein the processor
        sends, to a first device in the transmission system, a first communication frame including the first and second information stored in the first storage during an extra time after completion of the sending of the communication frame by each transmission station in the transmission period
        when a value obtained by dividing the extra time by a communication time required for sending of the first communication frame to the first device is equal to or greater than one, sends the first communication frame to the first device.

2. The transmission system according to claim 1, wherein the processor
    measures a first time as an interval of receiving the communication frame,
    when the first time exceeds a predetermined acceptable delay time takes such a state as reception of the communication frame, and
    obtains the first information.

3. The transmission system according to claim 1, wherein the processor
    obtains a difference between previously-obtained first information and currently-obtained first information, and
    when there is no difference, detects that there is an abnormality in the sending or reception of the communication frame.

4. The transmission system according to claim 2, wherein when the number of times that the first time exceeds the acceptable delay time exceeds the predetermined number of times, the processor detects that there is an abnormality in the sending or reception of the communication frame.

5. The transmission system according to claim 1, wherein when the number of times that the first information is obtained in the transmission period is different from the total number of times that the transmission stations send the communication frame in the transmission period, the processor detects that there is an abnormality in the sending or reception of the communication frame.

6. The transmission system according to claim 1, wherein when the value obtained by dividing the extra time by the communication time is less than one, the processor, using a transmission path physically different from the transmission path used for the sending or reception of the communication frame among the transmission stations, sends the first communication frame to the first device.

7. The transmission system according to claim 1, wherein a processor included in the first device:
    arranges, in chronological order, the first information contained in the first communication frame according to the second information contained in the first communication frame received from each transmission station, and
    identifies, based on a first information arrangement result, an abnormality occurrence condition in the sending or reception of the communication frame.

8. The transmission system according to claim 7, wherein the processor
    obtains a time required for transmission of the communication frame among the transmission stations based on the first information arrangement result, and
    identifies, using the obtained time, equipment through which the communication frame passes in the transmission among the transmission stations and a connection configuration of the transmission stations.

9. The transmission system according to claim 1, wherein the first device includes
    a second storage that stores, in a ring buffer format, the first information for each transmission station, the first information corresponding to the predetermined number of cycles in the transmission period or the number of transmission stations in the transmission system.

10. The transmission system according to claim 1, wherein
the processor obtains the first information only in any of a case of sending the communication frame and a case of receiving the communication frame.

11. The transmission system according to claim 1, wherein
the processor obtains the first information only during the extra time.

12. A transmission station for controlling control or monitoring targets, comprising:
a processor that;
sequentially obtains a sending permission subsequently after a synchronization frame sent by a predetermined transmission station of a plurality of transmission stations in a predetermined transmission period;
when the transmission station itself obtains the sending permission, sends a communication frame to other ones of the transmission stations, the transmission stations being connected together via a single transmission path; and
obtains first information regarding sending or reception of the communication frame in synchronization with the sending or reception of the communication frame; and
a first that stores the first information and second information indicating date and time of obtaining the first information
wherein the processor
sends, to a first device in the transmission system, a first communication frame including the first and second information stored in the first storage during an extra time after completion of the sending of the communication frame by each transmission station in the transmission period
when a value obtained by dividing the extra time by a communication time required for sending of the first communication frame to the first device is equal to or greater than one, sends the first communication frame to the first device.

* * * * *